(12) United States Patent
Miki et al.

(10) Patent No.: US 8,301,951 B2
(45) Date of Patent: Oct. 30, 2012

(54) BASE STATION WITH A RETRANSMISSION FUNCTION

(75) Inventors: Nobuhiko Miki, Yokohama (JP);
Hiroyuki Atarashi, Yokohama (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1038 days.

(21) Appl. No.: 12/278,946

(22) PCT Filed: Feb. 5, 2007

(86) PCT No.: PCT/JP2007/051922
§ 371 (c)(1),
(2), (4) Date: Oct. 27, 2008

(87) PCT Pub. No.: WO2007/091520
PCT Pub. Date: Aug. 16, 2007

(65) Prior Publication Data
US 2009/0217118 A1 Aug. 27, 2009

(30) Foreign Application Priority Data
Feb. 8, 2006 (JP) .................................. 2006-031747

(51) Int. Cl.
*G06F 11/00* (2006.01)
(52) U.S. Cl. ........................................ 714/748; 370/329
(58) Field of Classification Search .................. 714/748; 370/329
See application file for complete search history.

(56) References Cited

U.S. PATENT DOCUMENTS

| | | | |
|---|---|---|---|
| 7,979,768 B2* | 7/2011 | Sammour et al. | 714/748 |
| 8,006,158 B2* | 8/2011 | Kim et al. | 714/749 |
| 8,031,583 B2* | 10/2011 | Classon et al. | 370/208 |
| 2006/0194600 A1* | 8/2006 | Palin et al. | 455/512 |
| 2007/0263740 A1* | 11/2007 | Kwon et al. | 375/260 |
| 2008/0037496 A1* | 2/2008 | Smith et al. | 370/340 |
| 2009/0060081 A1* | 3/2009 | Zhang et al. | 375/267 |
| 2009/0103500 A1* | 4/2009 | Malkamaki et al. | 370/336 |
| 2010/0284364 A1* | 11/2010 | You et al. | 370/330 |

FOREIGN PATENT DOCUMENTS

| | | |
|---|---|---|
| JP | 2004-312291 | 11/2004 |
| JP | 2005-051712 | 2/2005 |
| JP | 2005-244958 | 9/2005 |
| JP | 2005-328520 | 11/2005 |

OTHER PUBLICATIONS

International Search Report (English & Japanese) for PCT/JP2007/051922 mailed May 15, 2007 (9 pages).

(Continued)

*Primary Examiner* — Philip Guyton
(74) *Attorney, Agent, or Firm* — Osha Liang LLP

(57) ABSTRACT

A base station includes a control unit configured to avoid contention between a radio resource allocated to a transmission packet or a retransmission packet by a channel-condition-based scheduling unit and a radio resource allocated to a transmission packet or a retransmission packet by a persistent scheduling unit.

14 Claims, 17 Drawing Sheets (a) SYNCHRONOUS ARQ (b) ASYNCHRONOUS ARQ

OTHER PUBLICATIONS

3GPP TS 25.212 v6.4.0 (Mar. 2005), 3rd Generation Partnership Project; Technical Specification Group Radio Access Network; Multiplexing and channel coding (FDD) Release 6 (85 pages).

3GPP TSG RAN1 LTE Ad Hoc; Jan. 25, 2006; R1-060009; "E-UTRA Downlink Control Channel Design and Performance and TP"; Motorola (7 pages).

Japanese Office Action for Application No. 2006-031747, mailed on Mar. 22, 2011 (5 pages).

"Persistant Scheduling for E-UTRA", TSG-RAN WG1 LTE AdHoc R1-060099, Jan. 2006.

3GPP TS 25.212 V6.7.0 (Dec. 2005), 3rd Generation Partnership Project: Technical Specification Group Radio Access Network; Multiplexing and Channel Coding (FDD), (Release 6), 84 pages.

\* cited by examiner

BASE STATION WITH A RETRANSMISSION FUNCTION

BACKGROUND OF THE INVENTION

1. Field of the Invention

The present invention relates to a base station for transmitting a retransmission packet when an error is detected in a transmission packet transmitted to a mobile station.

2. Description of the Related Art

Retransmission control schemes are used in radio communication systems, in which an error in a packet transmitted between a base station and a mobile station is detected and only a packet with the error is retransmitted. In view of retransmission timings, the retransmission control schemes are classified into two schemes as shown in FIG. 1. One scheme is referred to as Synchronous ARQ (automatic repeat request) and the other scheme is referred to as Asynchronous ARQ.

According to Synchronous ARQ, packets are retransmitted at predetermined retransmission timings. For example, when a transmission packet at a timing #0 (S00) is detected as an error packet, the corresponding retransmission packets can be transmitted at timings #0 (S10 and S20). Typically, retransmissions are performed at frames which are integral multiples of RTT (Round Trip Time) or control loop delay.

According to Asynchronous ARQ, packets are retransmitted at any timing after one RTT. For example, when a transmission packet at a timing #0 (A00) is detected as an error packet, the corresponding retransmission packets can be transmitted at any transmission slot timing (TTI: Transmission Time Interval) after A10. In other words, retransmissions are performed at any TTI (A10-A25) after one RTT from the transmission packet. Asynchronous ARQ is used in HSDPA (High Speed Downlink Packet Access) (see 3GPP TS 25.212, "Multiplexing and channel coding (FDD)", for example).

On the other hand, Persistent Scheduling is used in radio communication systems, in which a base station allocates radio resources according to a predetermined cycle and a predetermined frequency allocation pattern. FIG. 2 shows an example of Persistent Scheduling. FIG. 2 specifically shows an allocation pattern of radio resources allocated to a mobile station (user data) by the base station. According to Persistent Scheduling, radio resources are allocated to user data according to a predetermined cycle and a predetermined frequency allocation pattern. For example, the base station allocates radio resources by means of a pattern which changes allocation every 5 TTIs in the time direction and every frequency block in the frequency direction. In the shown example, after the base station allocates a radio resource to a mobile station (user data) at a timing T0 and a frequency block F0, the base station allocates a radio resource to the mobile station at a timing T5 and a frequency block F1. The predetermined cycle and the predetermined frequency allocation pattern are known to both the base station and the mobile station. Thus, the mobile station can receive, demodulate, and decode data according to the predetermined cycle and the predetermined frequency allocation pattern. According to Persistent Scheduling, the base station need not transmit radio resource allocation information to the mobile station, since both the base station and the mobile station share the radio resource allocation information. As a result, Persistent Scheduling has an advantage of reduced overhead. For example, Persistent Scheduling can be applied to real-time voice communications in which radio resources should be allocated on a constant cycle (applications with the requirement of reduced overhead, in which communications are performed with a constant transmission speed and at a low rate).

SUMMARY OF THE INVENTION

Problem(s) to be Solved by the Invention

As described above, according to Persistent Scheduling, radio resources are allocated according to a predetermined cycle and a predetermined frequency allocation pattern. When a transmission packet or the corresponding retransmission packet is transmitted according to commonly-used scheduling based on a channel condition (channel-condition-based scheduling or channel-fluctuation-based scheduling) rather than according to Persistent Scheduling, contention may occur between the transmission packet or the corresponding retransmission packet to be transmitted according to channel-condition-based scheduling and a transmission packet and the corresponding retransmission packet to be transmitted according to Persistent Scheduling. As shown in FIG. 3, according to Persistent Scheduling, a packet subsequent to a transmission packet at a time T5 and a frequency F1 is scheduled at a time T10 and a frequency F2, for example. In addition, according to Synchronous ARQ, when an error is detected in a packet transmitted at the time T5 and the frequency F2, the corresponding retransmission packet is scheduled at the time T10 and the frequency F2. Contention occurs in this manner.

Contention for a radio resource may also occur when the base station performs both scheduling for unicast data based on a channel condition for a mobile station and scheduling for broadcast/multicast data. For example, provided that multiple TTIs are allocated to broadcast/multicast data on a broadcast/multicast channel, when an error is detected in a unicast packet, the corresponding unicast retransmission packet cannot use radio resources allocated to the broadcast/multicast data. Contention occurs in this manner.

Furthermore, contention may occur when the base station performs scheduling for a transmission packet or the corresponding retransmission packet with a variable transmission time interval. For example, provided that a long packet with the length of 2 TTIs is retransmitted, when an error is detected in a short packet with the length of 1 TTI, the corresponding short retransmission packet cannot use radio resources allocated to the long retransmission packet. Contention occurs in this manner.

For this reason, there is a need for controlling radio resource allocation in the base station. Specifically, there is a problem associated with coexistence between Persistent Scheduling and Synchronous ARQ, because of the constraint of retransmission timings. Similarly, there is a problem associated with coexistence between Persistent Scheduling and Asynchronous ARQ. In addition, there is a problem associated with coexistence between scheduling for unicast data and scheduling for broadcast/multicast data. Furthermore, there is a problem associated with scheduling for a transmission packet or the corresponding retransmission packet with a variable transmission time interval.

In order to solve at least one of the aforementioned problems, it is a general object of the present invention to avoid contention for a radio resource scheduled by a base station.

Means for Solving the Problem

In one embodiment of the present invention, there is provided a base station having a retransmission function for transmitting a retransmission packet when an error is detected in a transmission packet which is transmitted to a mobile station on a frequency band including multiple resource blocks, including:

a channel-condition-based scheduling unit configured to schedule a transmission packet or a retransmission packet by allocating a radio resource to the transmission packet or the retransmission packet based on a channel condition for the mobile station;

a persistent scheduling unit configured to schedule a transmission packet or a retransmission packet by allocating a radio resource to the transmission packet or the retransmission packet according to a predetermined cycle and a predetermined frequency allocation pattern; and a control unit configured to avoid contention between the radio resource allocated to the transmission packet or the retransmission packet by the channel-condition-based scheduling unit and the radio resource allocated to the transmission packet or the retransmission packet by the persistent scheduling unit.

In one embodiment of the present invention, there is provided a base station having a retransmission function for transmitting a retransmission packet when an error is detected in a transmission packet which is transmitted to a mobile station, including:

a channel-condition-based scheduling unit configured to schedule a transmission packet or a retransmission packet by allocating a radio resource to the transmission packet or the retransmission packet based on a channel condition for the mobile station;

a broadcast/multicast data scheduling unit configured to schedule broadcast/multicast data on a broadcast/multicast channel by allocating a radio resource to the broadcast/multicast data to transmit the same transmission packet to multiple users within a cell; and a control unit configured to avoid contention between the radio resource allocated to the transmission packet or the retransmission packet by the channel-condition-based scheduling unit and the radio resource allocated to the broadcast/multicast data by the broadcast/multicast data scheduling unit.

In one embodiment of the present invention, there is provided a base station having a retransmission function for transmitting a retransmission packet when an error is detected in a transmission packet which is transmitted to a mobile station, including:

a channel-condition-based scheduling unit configured to schedule a transmission packet or a retransmission packet with a variable transmission time interval by allocating a radio resource to the transmission packet or the retransmission packet based on a channel condition for the mobile station; and a control unit configured to avoid contention among radio resources allocated to multiple retransmission packets with variable transmission time intervals by the channel-condition-based scheduling unit.

Effect of the Invention

According to an embodiment of the present invention, it is possible to avoid contention for a radio resource scheduled by a base station.

DESCRIPTION OF THE PREFERRED EMBODIMENTS

Figure 1:
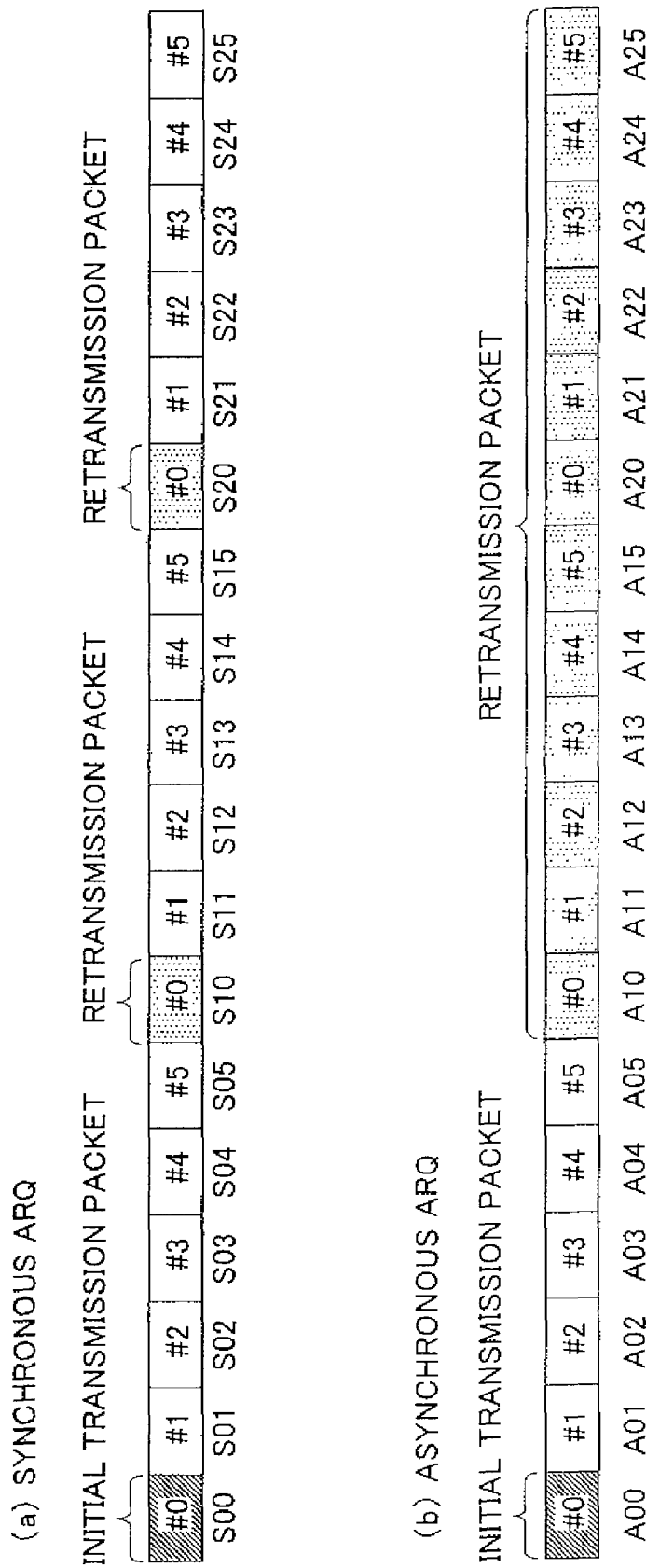
FIG. 1 shows a diagram illustrating retransmission control schemes according to Synchronous ARQ and Asynchronous ARQ.
Figure 2:
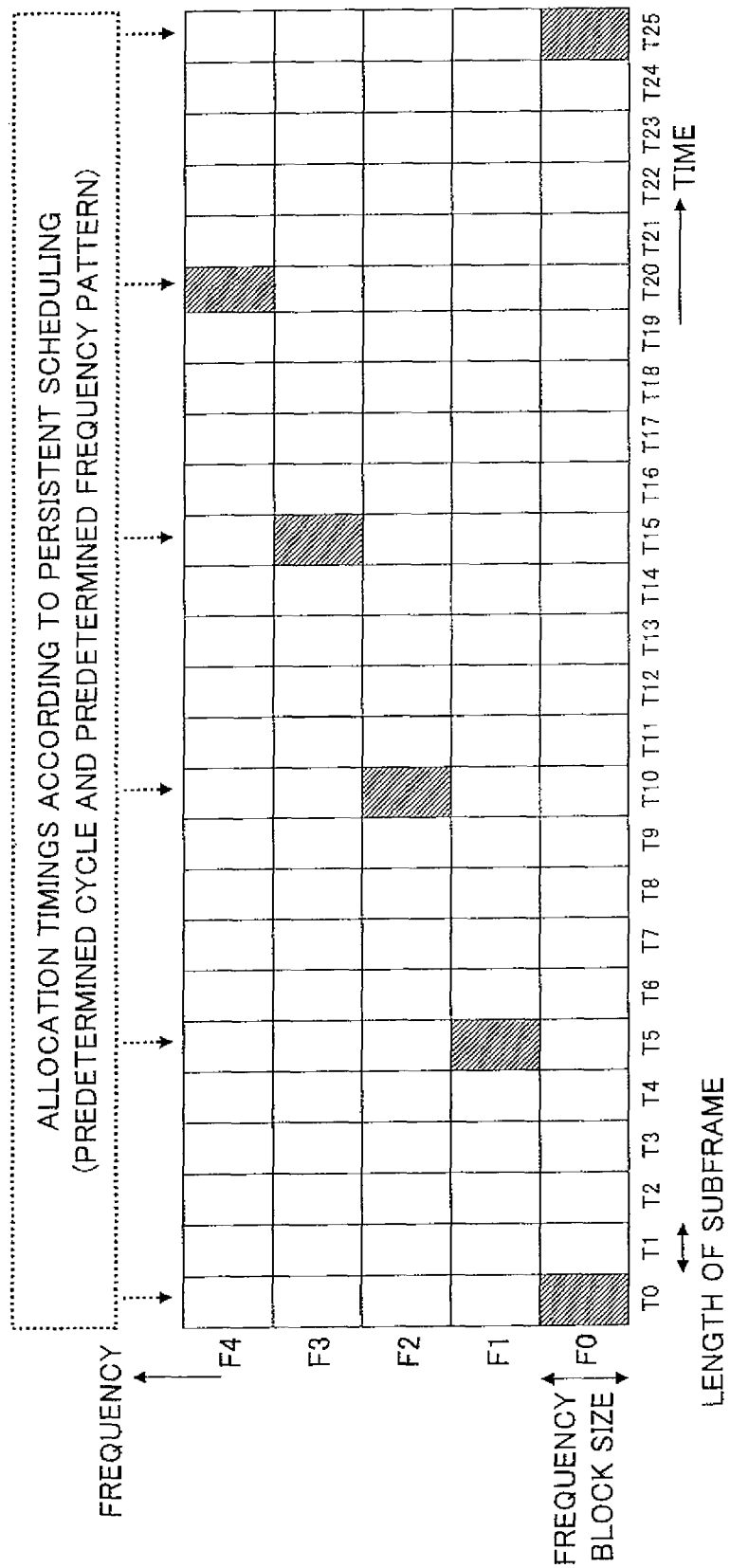
FIG. 2 shows a diagram illustrating a scheduling scheme according to Persistent Scheduling.

Description of Notations 10 base station
101 channel-condition-based scheduling unit
103 persistent scheduling unit
105 control unit
107 radio resource allocating unit
109 control signal generating and transmitting unit
20 mobile station
201 control signal processing unit
203 retransmission timing determining unit

BEST MODE OF CARRYING OUT THE INVENTION

With reference to the accompanying drawings, a description is given below with regard to preferred embodiments of the present invention.

First Embodiment

Figure 4:
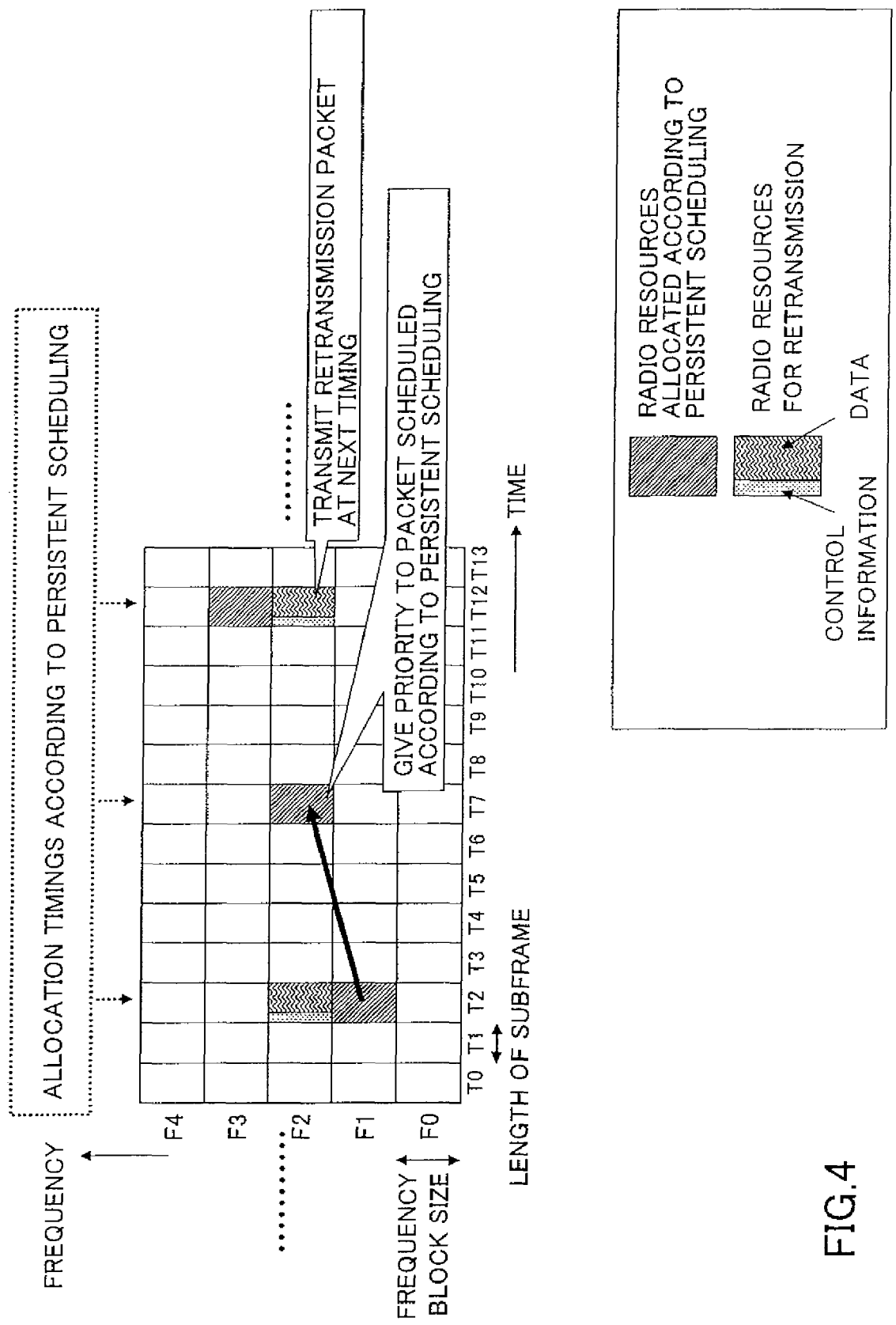
FIG. 4 shows a diagram illustrating a scheduling scheme in accordance with a first embodiment of the present invention.

FIG. 4 shows a diagram illustrating a scheduling scheme in accordance with a first embodiment of the present invention.

Figure 3:
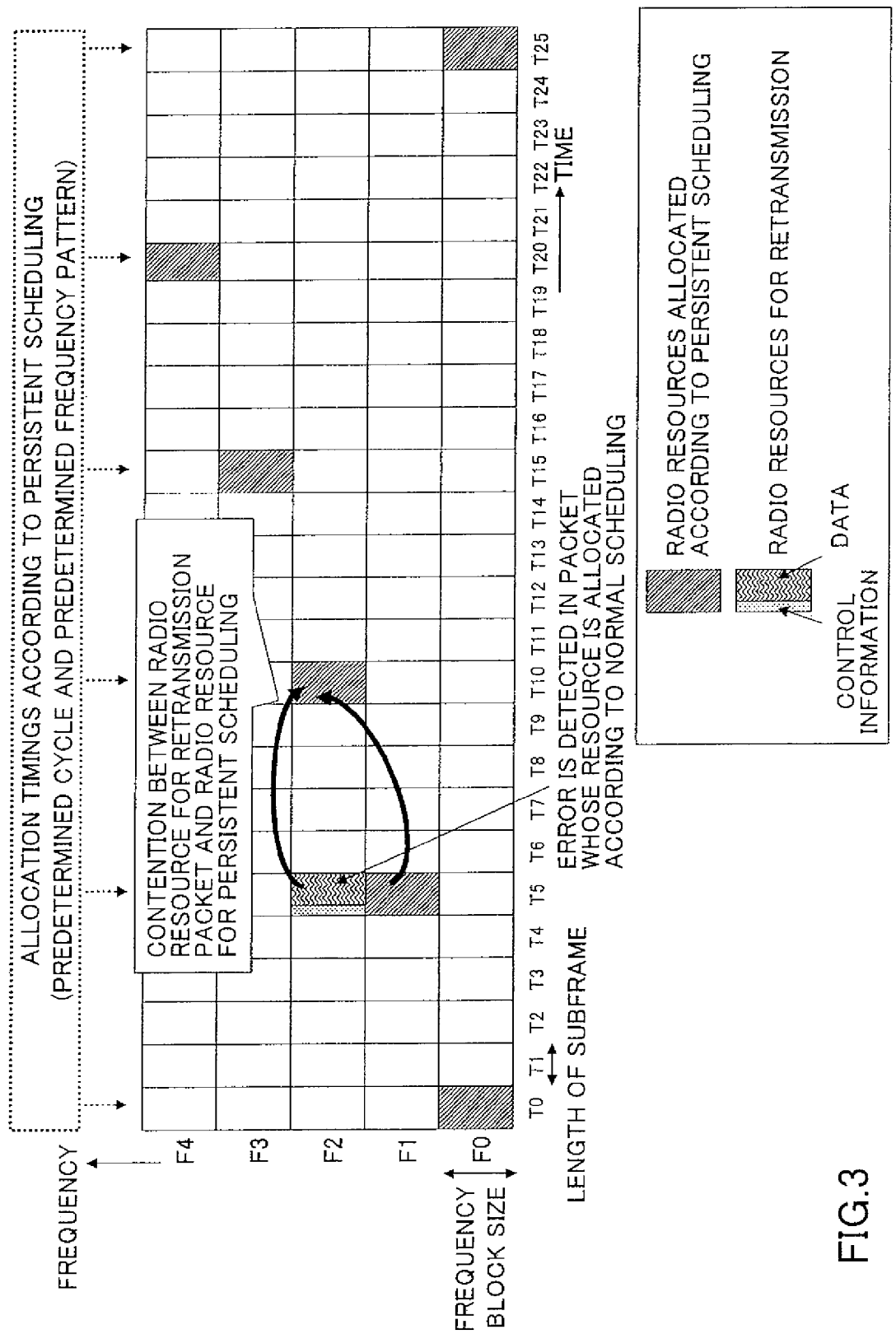
FIG. 3 shows a diagram illustrating a scheduling scheme by means of both Synchronous ARQ and Persistent Scheduling.

In the first embodiment, a base station gives a higher priority to a transmission packet or a retransmission packet scheduled according to Persistent Scheduling upon allocating a radio resource, when contention occurs as shown in FIG. 3.

In FIG. 4, the base station uses both Synchronous ARQ and Persistent Scheduling. A packet subsequent to a transmission packet at a time T2 and a frequency F1 is scheduled at a time T7 and a frequency F2 according to Persistent Scheduling. In addition, when an error is detected in a packet transmitted at the time T2 and the frequency F2, the corresponding retransmission packet is scheduled at the time T7 and the frequency F2 according to Synchronous ARQ. Since contention will occur in this case, the base station gives a higher priority to the transmission packet scheduled according to Persistent Scheduling upon allocating a radio resource. On the other hand, the retransmission packet is transmitted at the next RTT. Specifically, the retransmission packet is transmitted at a time T12 and the frequency F2.

Controlling contention for a radio resource in this manner allows for coexistence between Synchronous ARQ and Persistent Scheduling.

Second Embodiment

Figure 5:
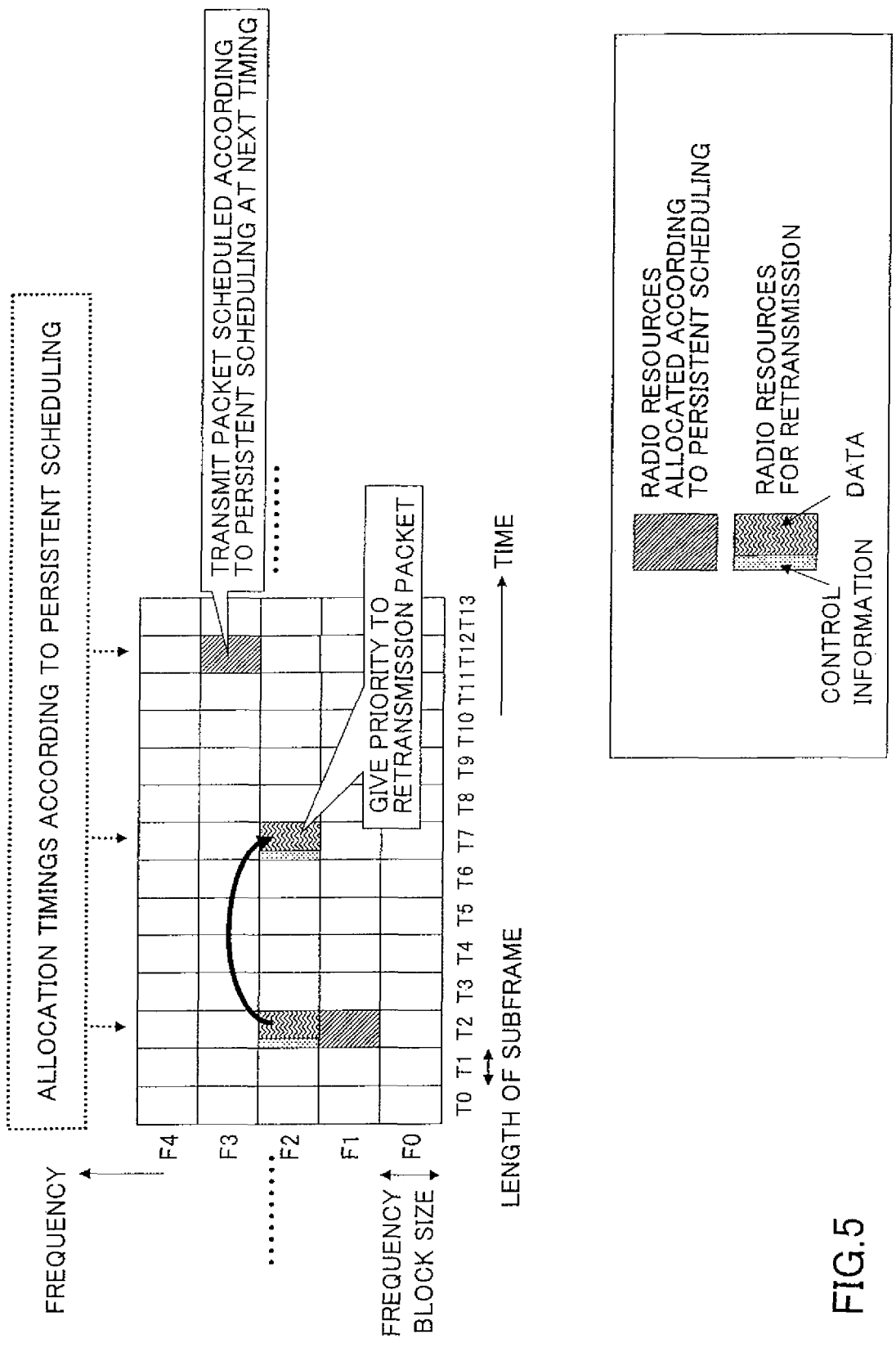
FIG. 5 shows a diagram illustrating a scheduling scheme in accordance with a second embodiment of the present invention.

FIG. 5 shows a diagram illustrating a scheduling scheme in accordance with a second embodiment of the present invention. In the second embodiment, a base station gives a higher priority to a retransmission packet scheduled according to a retransmission control scheme upon allocating a radio resource, when contention occurs as shown in FIG. 3.

In FIG. 5, the base station uses both Synchronous ARQ and Persistent Scheduling. A packet subsequent to a transmission packet at a time T2 and a frequency F1 is scheduled at a time T7 and a frequency F2 according to Persistent Scheduling. In addition, when an error is detected in a packet transmitted at the time T2 and the frequency F2, the corresponding retransmission packet is scheduled at the time T7 and the frequency F2 according to Synchronous ARQ. Since contention will occur in this case, the base station gives a higher priority to the retransmission packet scheduled according to Synchronous ARQ upon allocating a radio resource. On the other hand, the transmission packet scheduled according to Persistent Scheduling is transmitted at the next timing. Specifically, this transmission packet is transmitted at a time T12 and a frequency F3 instead of at the time T7 and the frequency F2.

Controlling contention for a radio resource in this manner allows for coexistence between Synchronous ARQ and Persistent Scheduling.

Structure of a Base Station in Accordance with the First or Second Embodiment

Figure 6:
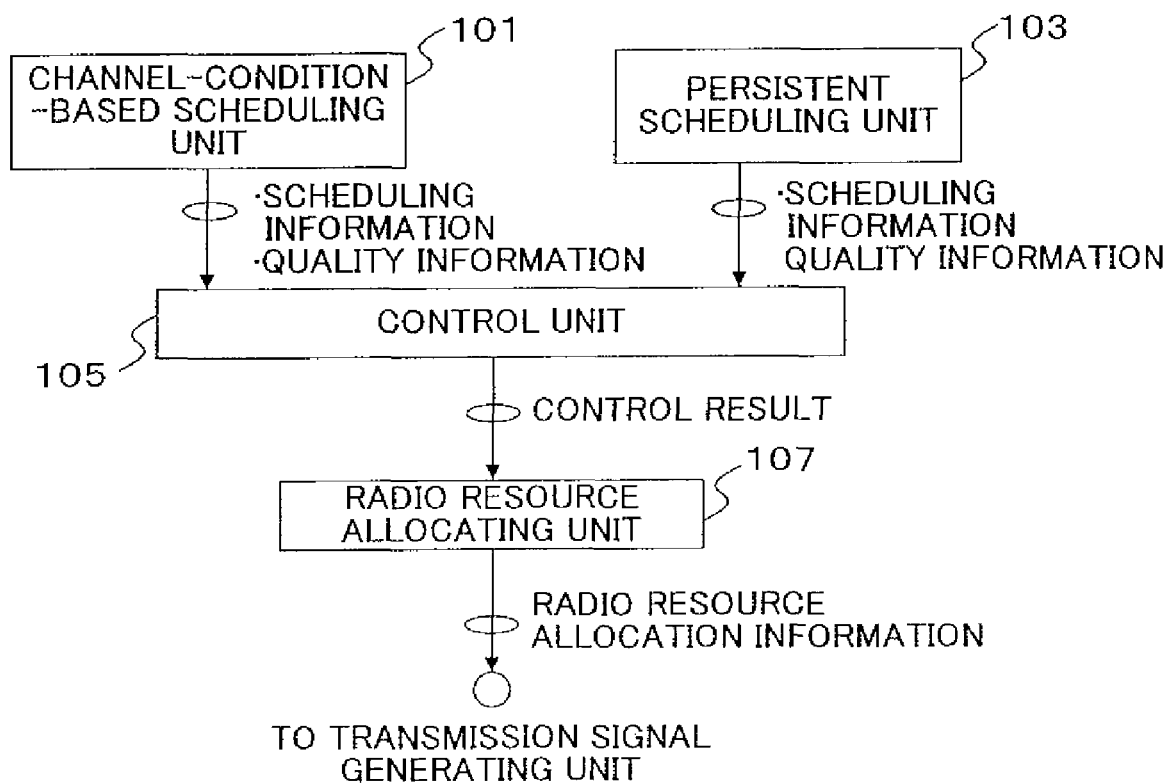
FIG. 6 shows a block diagram of a base station in accordance with the first or second embodiment of the present invention.

FIG. 6 shows a block diagram of a base station 10 in accordance with the first or second embodiment of the present invention. The base station 10 includes a channel-condition-based scheduling unit 101, a persistent scheduling unit 103, a control unit 105, and a radio resource allocating unit 107.

The channel-condition-based scheduling unit 101 schedules a transmission packet and a retransmission packet based on a channel condition for a mobile station. In the first or second embodiment, the channel-condition-based scheduling unit 101 schedules a retransmission packet by allocating a radio resource to the retransmission packet according to Synchronous ARQ. When an error is detected in a packet transmitted from the base station to the mobile station, the channel-condition-based scheduling unit 101 schedules the corresponding retransmission packet by allocating one of radio frames which are integral multiples of RTT to the retransmission packet. As described below, the channel-condition-based scheduling unit 101 may schedule the retransmission packet by allocating a radio resource to the retransmission packet according to Asynchronous ARQ.

The persistent scheduling unit 103 schedules a transmission packet or a retransmission packet by allocating a radio resource to the transmission packet or the retransmission packet according to Persistent Scheduling. More specifically, the persistent scheduling unit 103 schedules a transmission packet or a retransmission packet by allocating a radio resource to the transmission packet or the retransmission packet according to a predetermined cycle and a predetermined frequency allocation pattern.

The control unit 105 receives both scheduling information (radio resource) scheduled by the channel-condition based scheduling unit 101 and scheduling information (radio resource) scheduled by the persistent scheduling unit 103. Then the control unit 105 determines whether contention may occur and avoids contention between these scheduled radio resources. In the first embodiment, the control unit 105 gives a higher priority to the transmission packet or the retransmission packet scheduled by the persistent scheduling unit 103 upon allocating a radio resource. In the second embodiment, the control unit 105 gives a higher priority to the retransmission packet scheduled by the channel-condition-based scheduling unit 103 upon allocating a radio resource.

Alternatively, the control unit 105 may receive quality information such as a delay time or a packet error rate from both the channel-condition-based scheduling unit 101 and the persistent scheduling unit 103, compare quality information inputs, and give a higher priority based on the comparison upon allocating a radio resource.

The radio resource allocating unit 107 allocates a radio resource which is scheduled by the channel-condition based scheduling unit 101 and the persistent scheduling unit 103 and controlled by the control unit 105.

Structures of a Base Station and a Mobile Station in Accordance with a Third Embodiment In a third embodiment, a base station transmits a control signal to a mobile station, when contention may occur as shown in FIG. 3.

As shown in FIG. 3, when an error is detected in a packet transmitted at the time T5 and the frequency F2, contention occurs at the time T10 and the frequency F2. Accordingly, the base station specifies a radio resource used for the retransmission packet by means of control information (control bit). The base station may specify which radio resource is specifically used, or specify the radio resource according to a predetermined pattern (for example, referring to an adjacent block).

Figure 7:
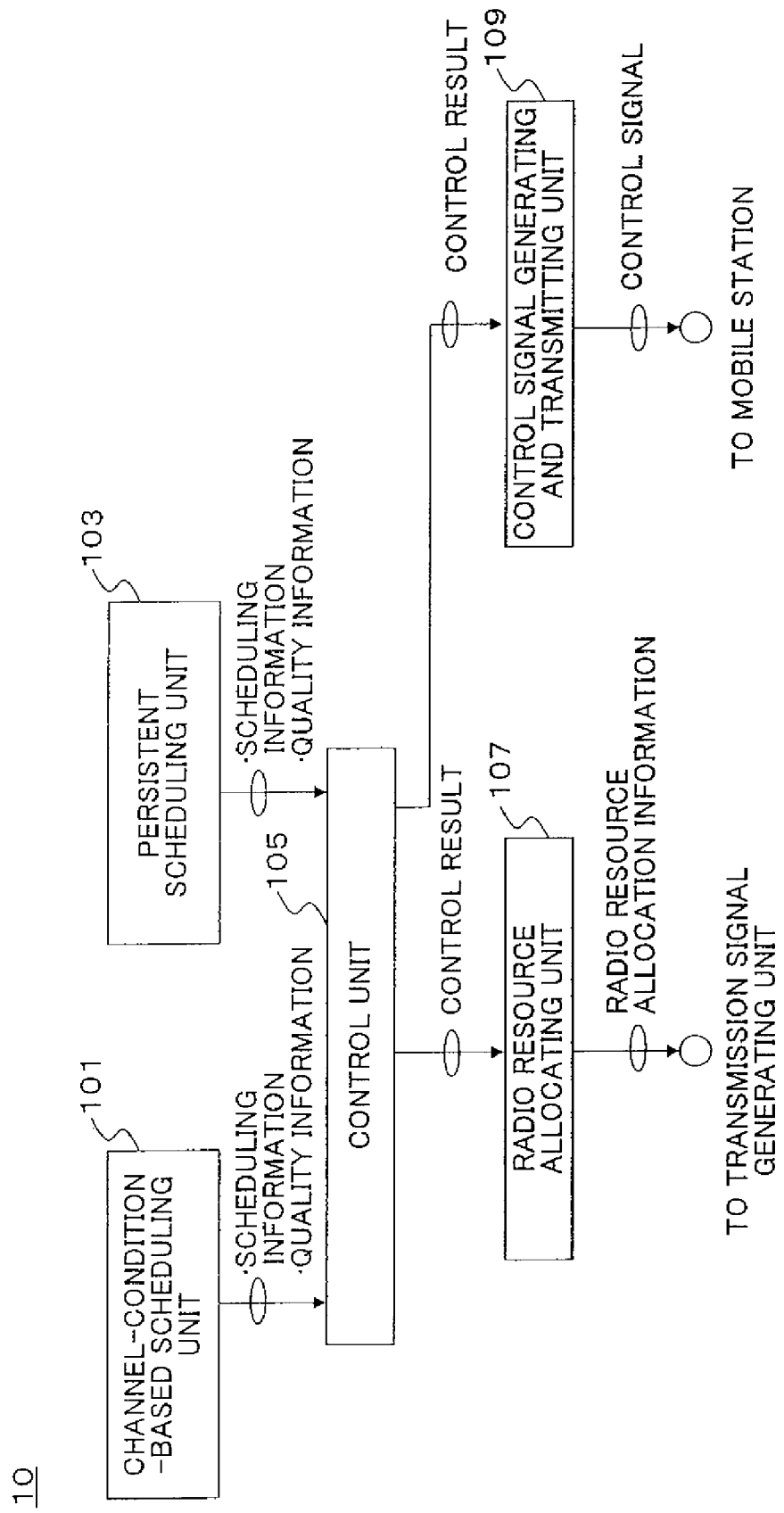
FIG. 7 shows a block diagram of a base station in accordance with a third embodiment of the present invention.

FIG. 7 shows a block diagram of a base station 10 in accordance with the third embodiment of the present invention. The base station in FIG. 7 is identical with the base station in FIG. 6 except for a control signal generating and transmitting unit 109. The control signal generating and transmitting unit 109 receives a control result from the control unit 105, generates a control signal specifying the radio resource to be used for the retransmission packet, and transmits the control signal to the mobile station.

Figure 8:
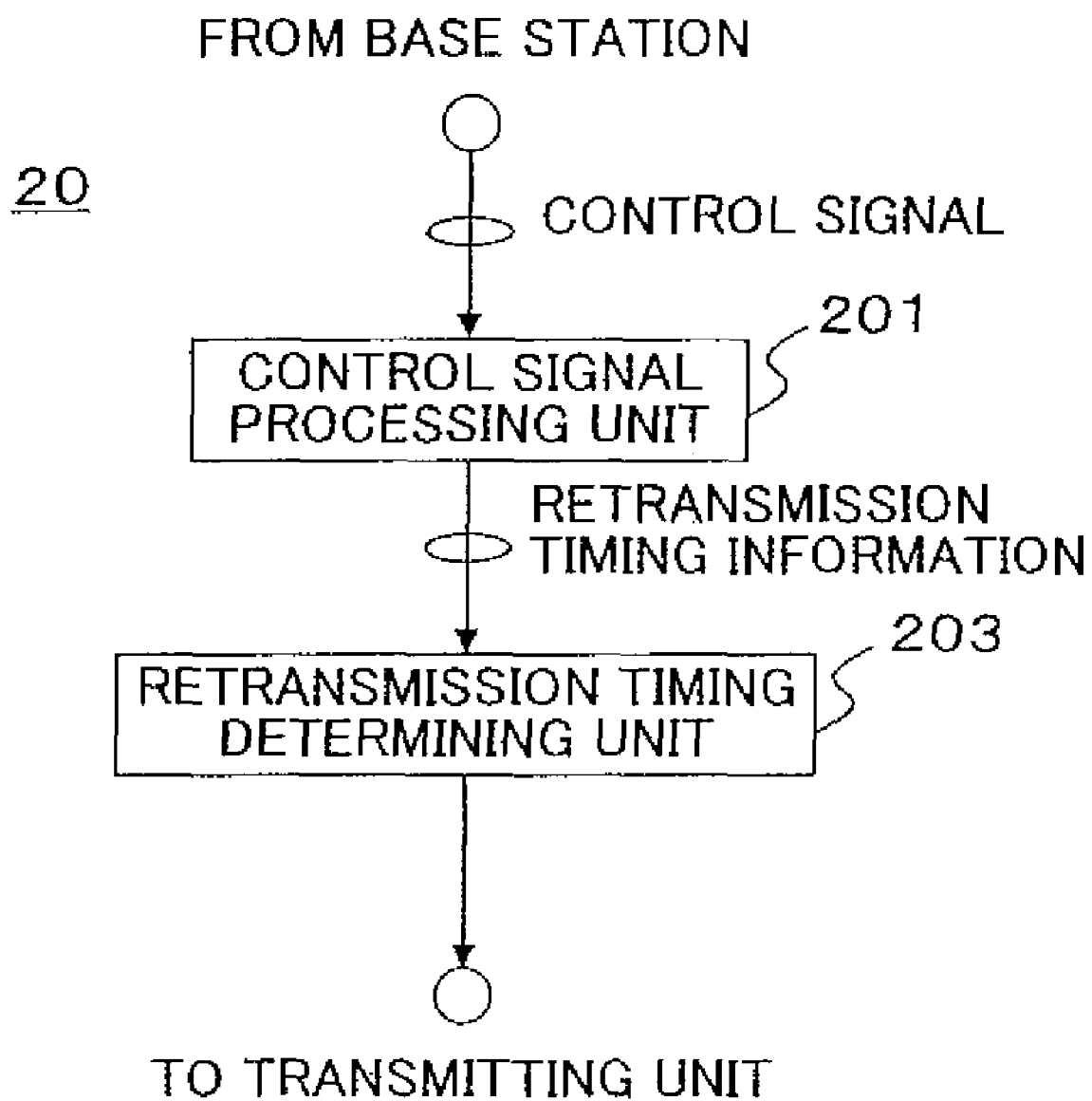
FIG. 8 shows a block diagram of a mobile station in accordance with the third embodiment of the present invention.

FIG. 8 shows a block diagram of a mobile station 20 in accordance with the third embodiment of the present invention. The mobile station 20 includes a control signal processing unit 201 and a retransmission timing determining unit 203. The control signal processing unit 201 demodulates and decodes a control signal received from the base station, and extracts timing information for a retransmission packet. The retransmission timing determining unit 203 determines a timing at which the retransmission packet is to be transmitted to the mobile station based on the extracted timing information.

The control signal transmitted from the base station to the mobile station may be transmitted along with scheduled allocation information which is transmitted for each subframe. Specifically, the control signal generating and transmitting unit 109 may transmit the control result by the control unit 105, when the base station transmits a retransmission request upon detecting an error in a transmission packet at the time T5 and frequency F2 in FIG. 3. In this case, the control signal is transmitted on a channel for L1/L2 control information.

Alternatively, the control signal may be transmitted from the base station to the mobile station as upper layer control information. Specifically, the control signal may be transmitted as system information on a broadcast channel or transmitted along with user data on a shared data channel. In this case, the control signal is transmitted with longer cycles, compared to the case where the control signal is transmitted for each subframe.

Fourth Embodiment

Figure 9:
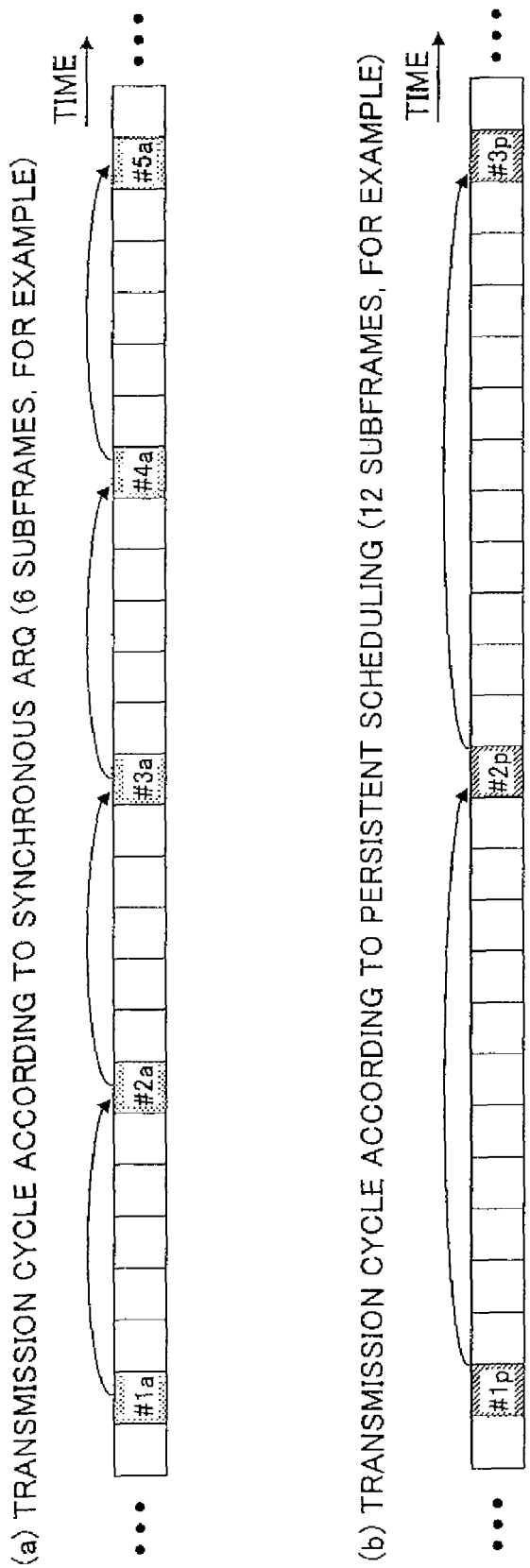
FIG. 9 shows a diagram illustrating a scheduling scheme in accordance with a fourth embodiment of the present invention.

FIG. 9 shows a diagram illustrating a scheduling scheme in accordance with a fourth embodiment of the present invention. In the fourth embodiment, a transmission cycle for a transmission packet or a retransmission packet scheduled by the persistent scheduling unit 103 and a transmission cycle for a transmission packet or a retransmission packet scheduled by the channel-condition-based scheduling unit 101 are controlled to be mutually integral multiples.

As described above, the transmission cycle for the retransmission packet scheduled according to Synchronous ARQ is typically an integral multiple of RTT (six subframes in FIG. 9). Controlling the transmission cycle for the transmission packet scheduled by the persistent scheduling unit 103 to be an integral multiple of the transmission cycle for the retransmission packet (twelve subframes in FIG. 9) allows the base station and the mobile station to identify contention for a radio resource in advance. Specifically, contention occurs between a retransmission packet scheduled at a time #1a and a transmission packet scheduled at a time #1p. However, contention never occurs for a retransmission packet scheduled at a time #2a.

This relationship allows the base station and the mobile station to identify when contention for a radio resource will occur. Thus, this relationship simplifies the structures of the base station and the mobile station in terms of scheduling and retransmission control. In addition, radio resources without contention (unaffected by Persistent Scheduling) can be reserved.

Structure of a Base Station in Accordance with the Fourth Embodiment

Figure 10:
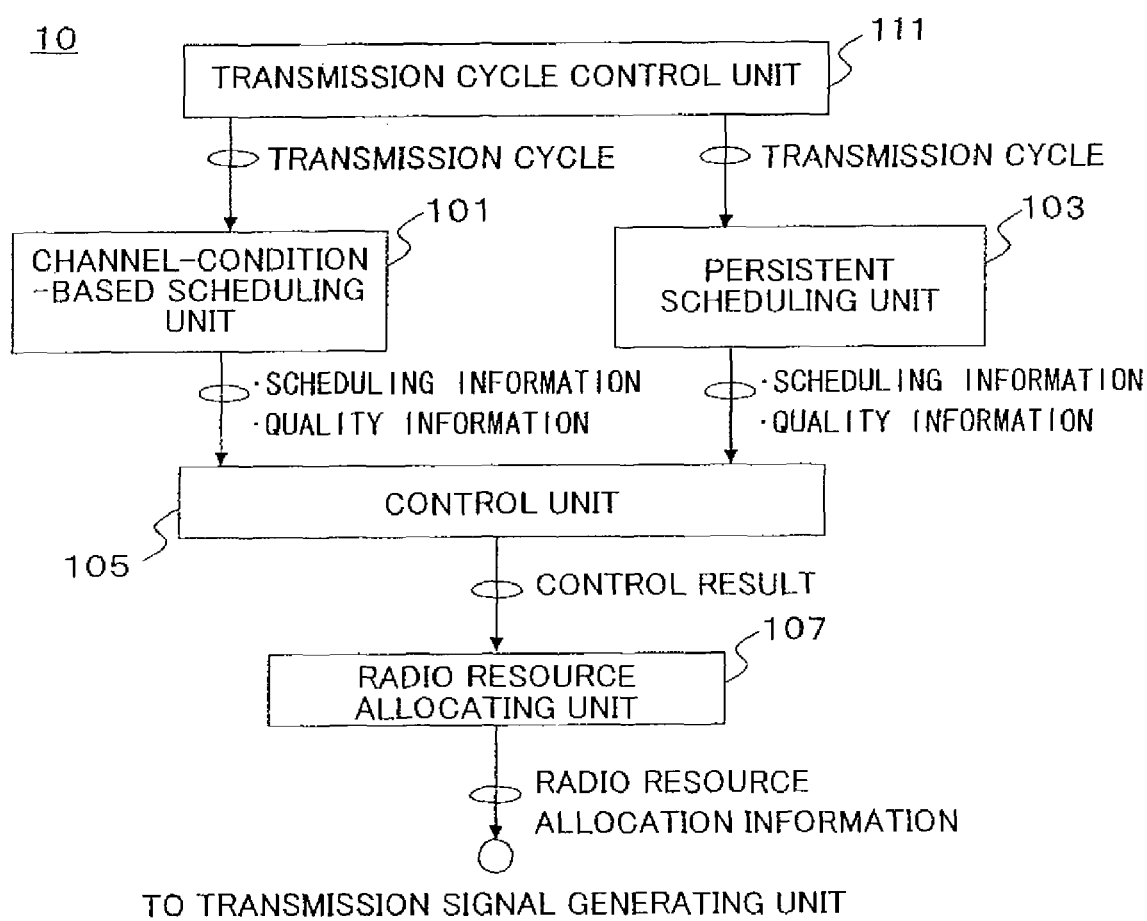
FIG. 10 shows a block diagram of a base station in accordance with the fourth embodiment of the present invention.

FIG. 10 shows a block diagram of a base station 10 in accordance with the fourth embodiment of the present invention. The base station in FIG. 10 is identical with the base station in FIG. 6 except for a transmission cycle control unit 111. The transmission cycle control unit 111 controls the transmission cycle for the transmission packet or the retransmission packet scheduled by the persistent scheduling unit 103 and the transmission cycle for the transmission packet or the retransmission packet scheduled by the channel-condition-based scheduling unit 101 to have a predetermined relationship (integral multiple, for example). The transmission cycle control unit 111 provides the transmission cycles to the channel-condition-based scheduling unit 101 and the persistent scheduling unit 103, respectively.

Fifth Embodiment

Figure 11:
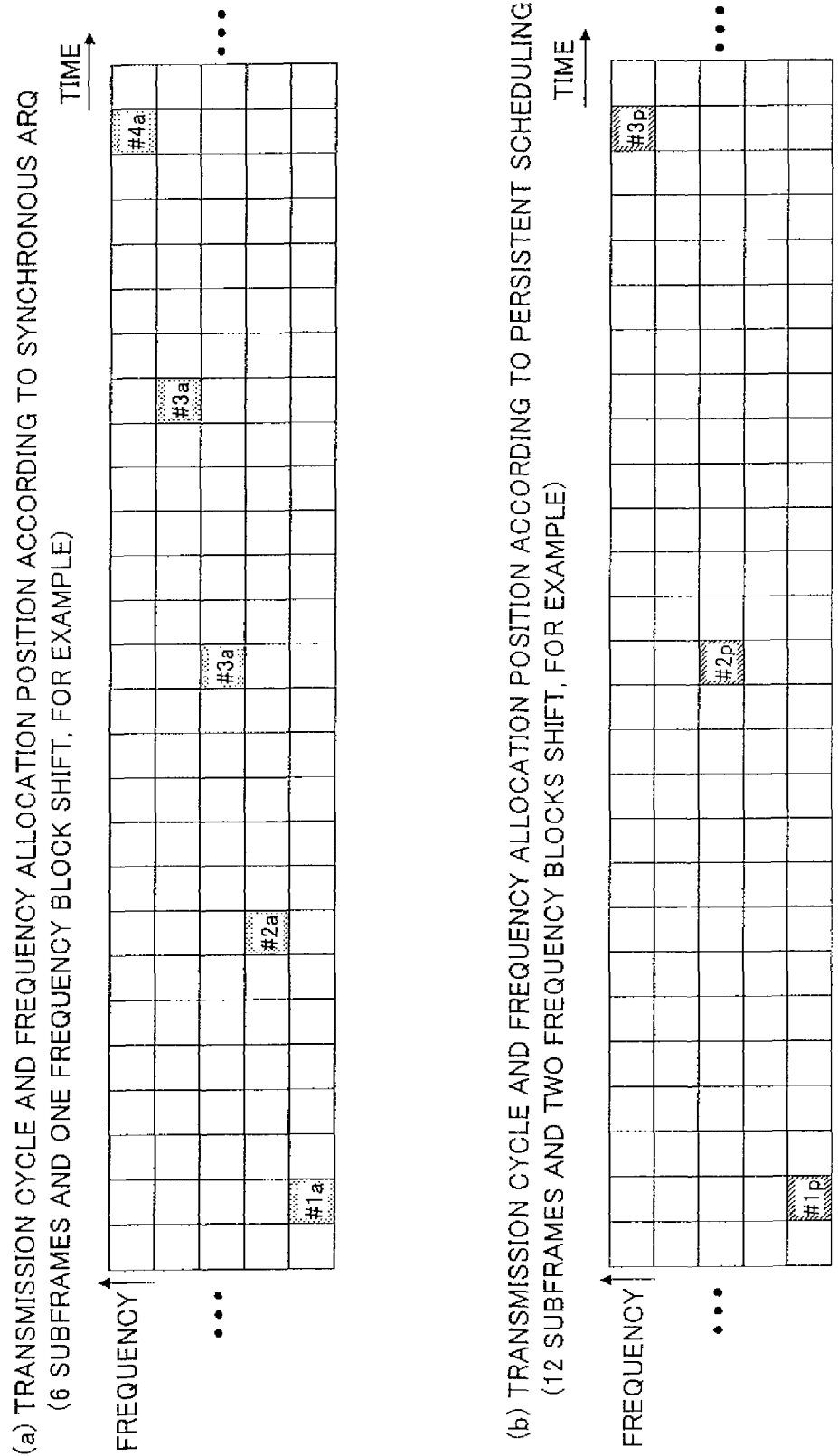
FIG. 11 shows a diagram illustrating a scheduling scheme in accordance with a fifth embodiment of the present invention.

FIG. 11 shows a diagram illustrating a scheduling scheme in accordance with a fifth embodiment of the present invention. In the fifth embodiment, a frequency allocation position for a transmission packet or a retransmission packet scheduled by the persistent scheduling unit 103 and a frequency allocation position for a transmission packet or a retransmission packet scheduled by the channel-condition-based scheduling unit 101 are controlled to have a predetermined relationship.

As shown in FIG. 11, for a retransmission packet scheduled according to Synchronous ARQ, a transmission cycle is controlled to be six subframes and a frequency allocation position is controlled to shift by one frequency block. In addition, for a transmission packet scheduled by the persistent scheduling unit 103, a transmission cycle is controlled to be twelve subframes (integral multiple of the transmission cycle for Synchronous ARQ) and a frequency allocation position is controlled to shift by two frequency blocks (integral multiple of the frequency allocation position for Synchronous ARQ). Controlling the frequency allocation positions in addition to transmission cycles to have the predetermined relationship allows the base station and the mobile station to identify contention for a radio resource in advance. Specifically, contention occurs between a retransmission packet scheduled at a time #1a and a transmission packet scheduled at a time #1p. However, contention never occurs for a retransmission packet scheduled at a time #2a.

This relationship allows the base station and the mobile station to identify when contention for a radio resource will occur. Thus, this relationship simplifies the structures of the base station and the mobile station in terms of scheduling and retransmission control. In addition, radio resources without contention (unaffected by Persistent Scheduling) can be reserved.

Structure of a Base Station in Accordance with the Fifth Embodiment

Figure 12:
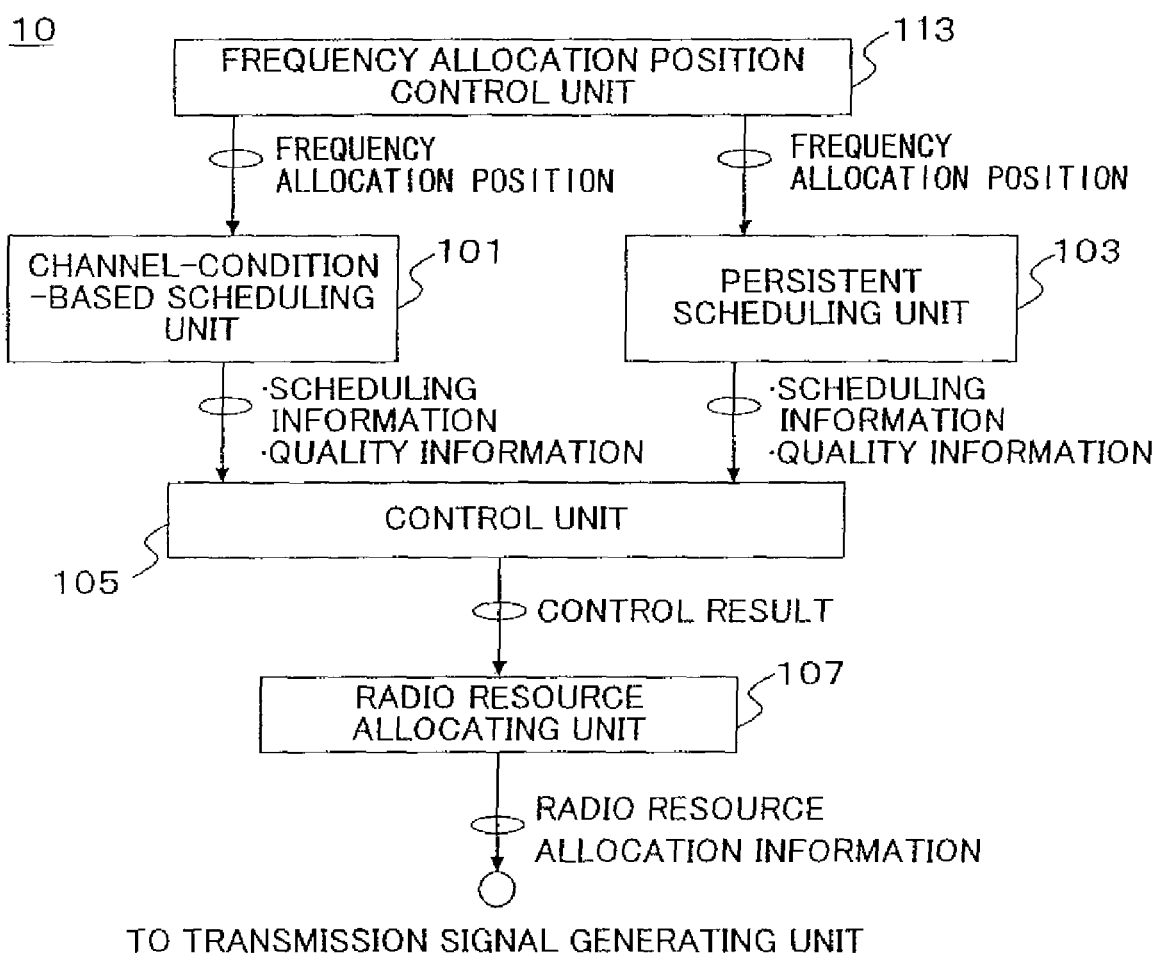
FIG. 12 shows a block diagram of a base station in accordance with the fifth embodiment of the present invention.

FIG. 12 shows a block diagram of a base station 10 in accordance with the fifth embodiment of the present invention. The base station in FIG. 12 is identical with the base station in FIG. 6 except for a frequency allocation position control unit 113. The frequency allocation position control unit 113 controls the frequency allocation position for the transmission packet or the retransmission packet scheduled by the persistent scheduling unit 103 and the frequency allocation position for the transmission packet or the retransmission packet scheduled by the channel-condition-based scheduling unit 101 to have a predetermined relationship (integral multiple, for example). The frequency allocation position control unit 113 provides the frequency allocation positions to the channel-condition-based scheduling unit 101 and the persistent scheduling unit 103, respectively.

Sixth Embodiment

Figure 13:
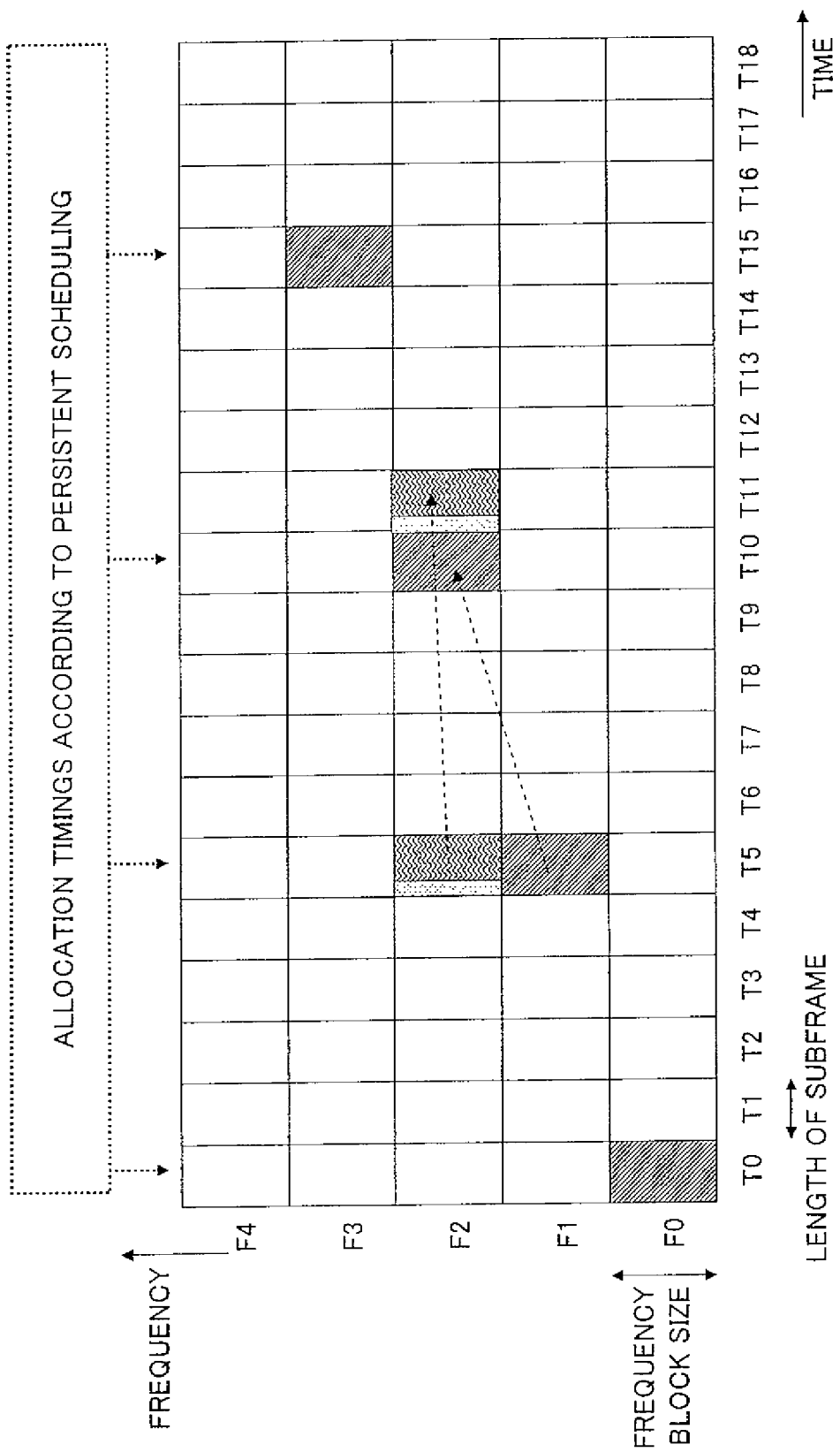
FIG. 13 shows a diagram illustrating a scheduling scheme in accordance with a sixth embodiment of the present invention.

FIG. 13 shows a diagram illustrating a scheduling scheme in accordance with a sixth embodiment of the present invention. In the sixth embodiment, Asynchronous ARQ is used for the retransmission control scheme.

As described above, according to Asynchronous ARQ, packets can be retransmitted at any TTI after one RTT. Accordingly, when an error is detected in a packet transmitted at a time T5 and a frequency F2, the corresponding retransmission packet is transmitted at a time and a frequency without contention with a radio resource scheduled according to Persistent Scheduling. In other words, the base station gives a higher priority to the transmission packet scheduled according to Persistent Scheduling upon allocating a radio resource, and allocates a radio resource which is not used for Persistent Scheduling to the retransmission packet.

Controlling contention for a radio resource in this manner allows for coexistence between Asynchronous ARQ and Persistent Scheduling.

Seventh Embodiment

Figure 14:
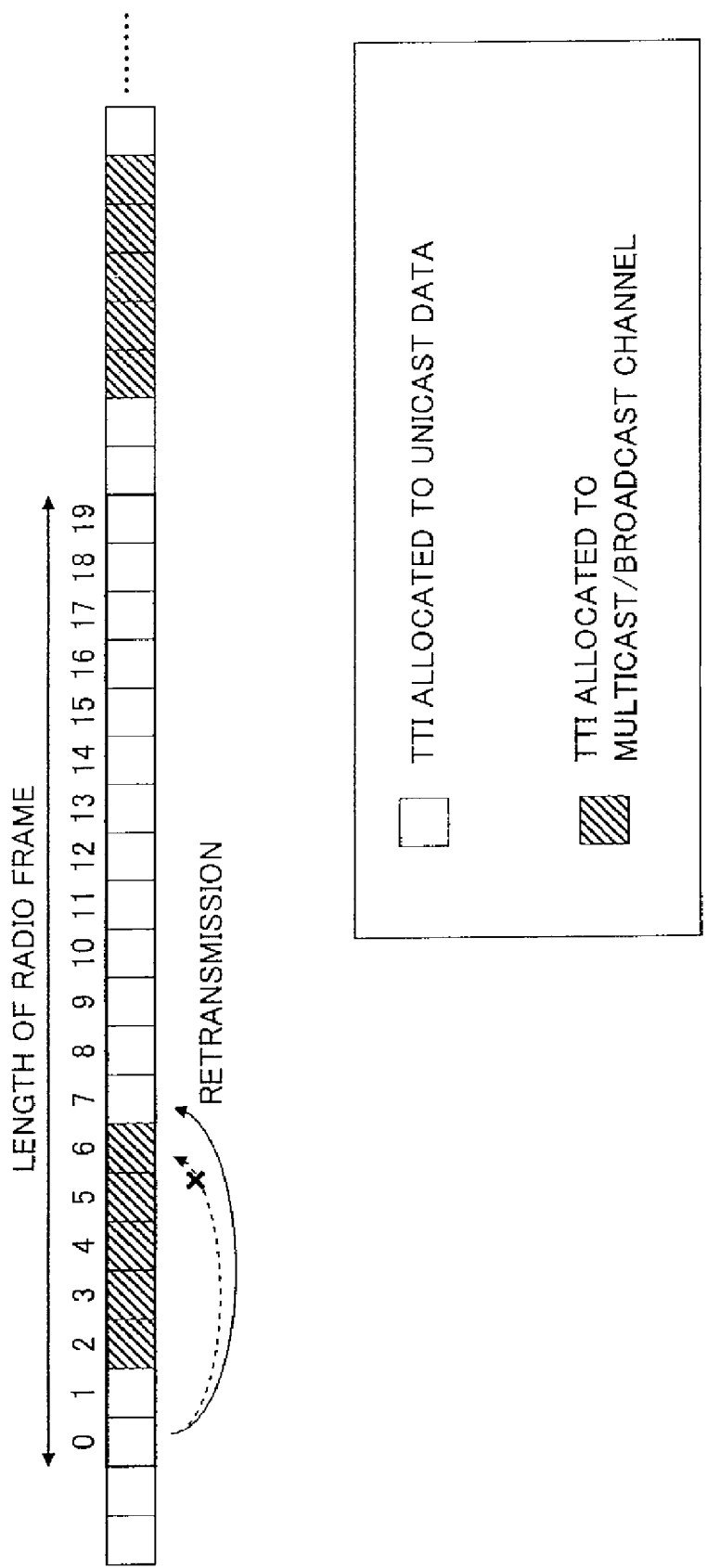
FIG. 14 shows a diagram illustrating a scheduling scheme in accordance with a seventh embodiment of the present invention.

FIG. 14 shows a diagram illustrating a scheduling scheme in accordance with a seventh embodiment of the present invention. In the seventh embodiment, Asynchronous ARQ is used for the retransmission control scheme. It is also assumed that one RTT is equal to 6 TTIs. In the seventh embodiment, the base station allocates a radio resource to broadcast/multicast data on a broadcast/multicast channel to transmit the same transmission packet to specified or unspecified multiple users within multiple cells (or within a cell).

As shown in FIG. 14, TTIs from a second TTI to a sixth TTI are allocated to multicast/broadcast data and the other TTIs are allocated to unicast data, for example. In the seventh embodiment, the base station uses both the unicast channel on which packets are transmitted to a specified user and the multicast/broadcast channel on which packets are transmitted to specified or unspecified multiple users. When an error is detected in a packet for unicast data transmitted at #0, the corresponding retransmission packet can be transmitted after 6 TTIs (one RTT) according to Asynchronous ARQ. However, the base station cannot allocate a radio resource to the retransmission packet for unicast data at the sixth TTI, because the sixth TTI is allocated to multicast/broadcast data. Instead, the base station allocates a seventh TTI to the retransmission packet among TTIs after 6 TTIs from the seventh TTI which are available for unicast data. Controlling contention for a radio resource in this manner allows for coexistence between Asynchronous ARQ for unicast data and scheduling for multicast/broadcast data.

Figure 15:
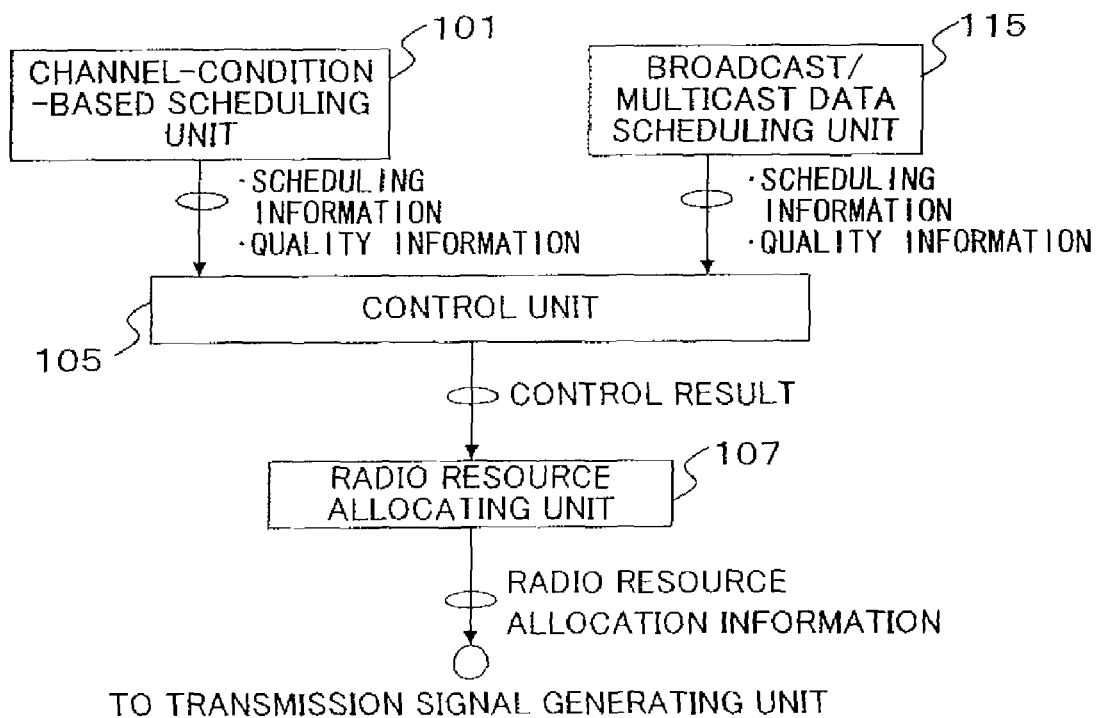
FIG. 15 shows a block diagram of a base station in accordance with the seventh embodiment of the present invention.

The base station in accordance with the seventh embodiment has a structure similar to the base station 10 shown in FIG. 6. The channel-condition-based scheduling unit 101 schedules a retransmission packet for unicast data on the unicast channel according to Asynchronous ARQ. As shown in FIG. 15, the base station 10 includes, in place of the persistent scheduling unit 103, a broadcast/multicast data scheduling unit 115 for scheduling broadcast/multicast data on the broadcast/multicast channel by allocating a radio resource to the broadcast/multicast data. The control unit 105 avoids contention between the radio resource allocated to the transmission packet or the retransmission packet by the channel-condition-based scheduling unit 101 and the radio resource allocated to the broadcast/multicast data by the broadcast/multicast data scheduling unit 115. For example, the control unit 105 gives a higher priority to the broadcast/multicast data scheduled by the broadcast/multicast data scheduling unit 115 upon allocating a radio resource.

Eighth Embodiment

Figure 16:
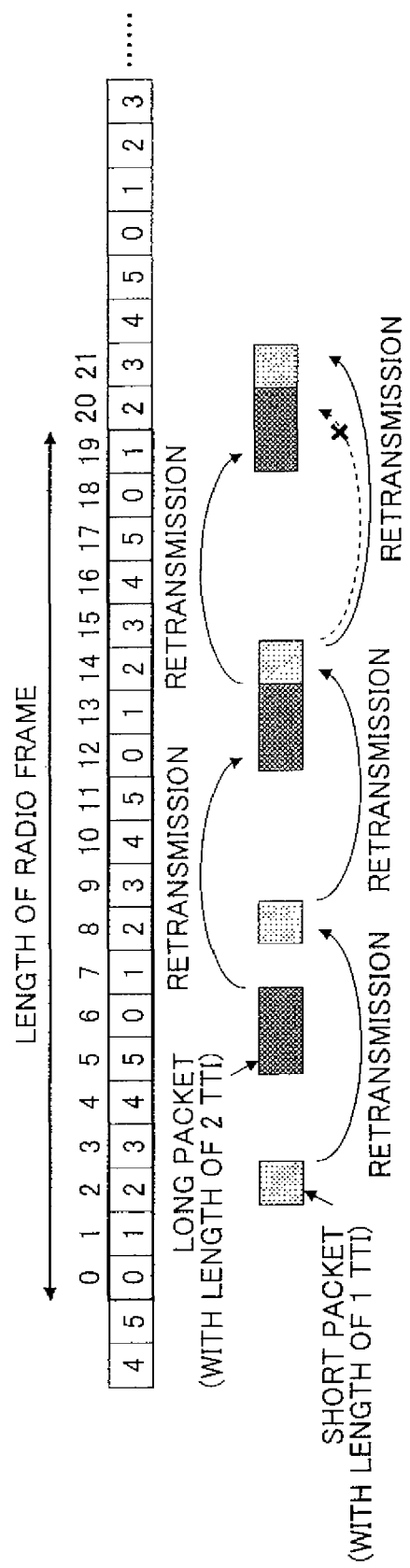
FIG. 16 shows a diagram illustrating a scheduling scheme in accordance with an eighth embodiment of the present invention.

FIG. 16 shows a diagram illustrating a scheduling scheme in accordance with an eighth embodiment of the present invention. In the eighth embodiment, Asynchronous ARQ is used for the retransmission control scheme. It is also assumed that one RTT is equal to 6 TTIs. In the eighth embodiment, the base station allocates a radio resource to a transmission packet or a retransmission packet with a variable transmission time interval.

FIG. 16 shows a short packet with the length of 1 TTI and a long packet with the length of 2 TTIs, as an example of transmission packets with variable transmission time intervals. FIG. 16 also shows retransmission packets for both the short packet and the long packet. In the eighth embodiment, the base station uses both the short packet and the long packet. Even though there is no contention between the short packet and the long packet at the initial transmission, contention may occur among their respective retransmission packets. For example, when an error is detected in a long packet transmitted at twelfth and thirteenth TTIs, the corresponding retransmission packet can be transmitted at nineteenth and twentieth TTIs after 6 TTIs (one RTT) from the twelfth and thirteenth TTIs. On the other hand, when an error is detected in a short packet transmitted at a fourteenth TTI, the corresponding retransmission packet can be transmitted at the twentieth TTI after 6 TTIs (one RTT) from the fourteenth TTI. However, contention for a radio resource occurs at the twentieth TTI, when both of the retransmission packets are transmitted according to the cycle of 6 TTIs. Accordingly, the base station allocates a twenty-first TTI to the retransmission packet for the short packet, for example, in order to avoid contention with the long packet. Controlling contention for a radio resource in this manner allows for coexistence among transmission packets or retransmission packets with variable transmission time intervals.

Figure 17:
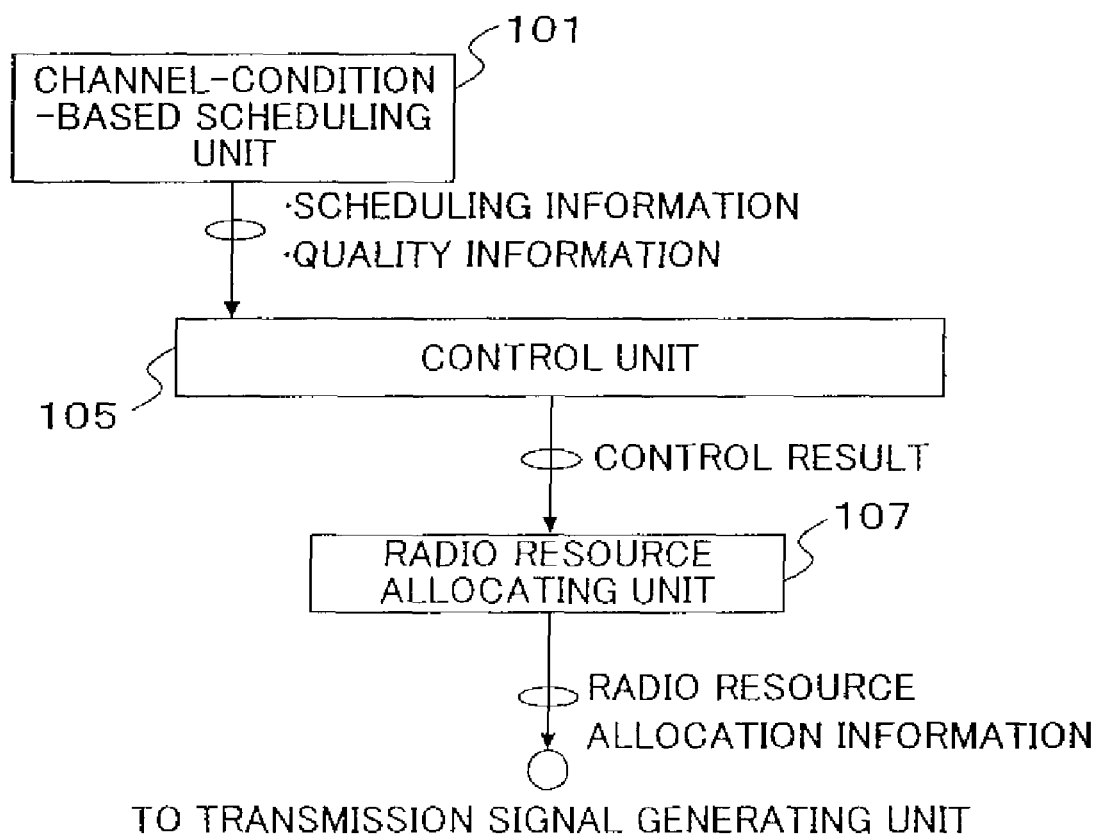
FIG. 17 shows a block diagram of a base station in accordance with the eighth embodiment of the present invention.

The base station in accordance with the eighth embodiment has a structure similar to the base station 10 shown in FIG. 6. The channel-condition-based scheduling unit 101 schedules a long packet and a short packet according to Asynchronous ARQ. As shown in FIG. 17, the base station may not include the persistent scheduling unit 103. The control unit 105 avoids contention among radio resources allocated to transmission packets or retransmission packets for the long packet and the short packet by the channel-condition-based scheduling unit 101. For example, the control unit 105 gives a higher priority to the long packet upon allocating a radio resource.

The present invention is not limited to the specifically disclosed embodiments, and variations and modifications may be made without departing from the scope of the present invention.

This international patent application is based on Japanese Priority Application No. 2006-031747 filed on Feb. 8, 2006, the entire contents of which are incorporated herein by reference.

What is claimed is:

1. A base station having a retransmission function for transmitting a retransmission packet when an error is detected in a transmission packet which is transmitted to a mobile station on a frequency band including multiple resource blocks, comprising:
   a channel-condition-based scheduling unit configured to schedule a transmission packet or a retransmission packet by allocating a radio resource to the transmission packet or the retransmission packet based on a channel condition for the mobile station;
   a persistent scheduling unit configured to schedule a transmission packet or a retransmission packet by allocating a radio resource to the transmission packet or the retransmission packet according to a predetermined cycle and a predetermined frequency allocation pattern;

a control unit configured to avoid contention between the radio resource allocated to the transmission packet or the retransmission packet by the channel-condition-based scheduling unit and the radio resource allocated to the transmission packet or the retransmission packet by the persistent scheduling unit, and a non-transitory transmitting unit configured to transmit the transmission packet or the retransmission packet to the mobile station as a result of control by the control unit.

2. The base station as claimed in claim 1, wherein:

the channel-condition-based scheduling unit schedules the retransmission packet according to Synchronous ARQ; and the control unit gives a higher priority to the retransmission packet scheduled by the channel-condition-based scheduling unit upon allocating a radio resource.

3. The base station as claimed in claim 1, wherein:

the channel-condition-based scheduling unit schedules the retransmission packet according to Synchronous ARQ; and the control unit gives a higher priority to the transmission packet or the retransmission packet scheduled by the persistent scheduling unit upon allocating a radio resource.

4. The base station as claimed in claim 1, wherein:

the control unit compares quality required for the transmission packet or the retransmission packet scheduled by the channel-condition-based scheduling unit with quality required for the transmission packet or the retransmission packet scheduled by the persistent scheduling unit, and gives a higher priority to the transmission packet or the retransmission packet scheduled by either the channel-condition-based scheduling unit or the persistent scheduling unit based on the comparison upon allocating a radio resource.

5. The base station as claimed in claim 3, further comprising:

a control signal generating and transmitting unit configured to generate and transmit a control signal notifying the mobile station of a radio resource to be used for the retransmission packet as a result of control by the control unit.

6. The base station as claimed in claim 5, wherein:

the control signal generating and transmitting unit generates and transmits the control signal along with scheduled allocation information which is transmitted for each subframe, when the control unit detects the contention.

7. The base station as claimed in claim 5, wherein:

the control signal generating and transmitting unit generates and transmits the control signal as upper layer control information.

8. The base station as claimed in claim 1, further comprising:

a transmission cycle control unit configured to control a transmission cycle for the transmission packet or the retransmission packet scheduled by the persistent scheduling unit and a transmission cycle for the transmission packet or the retransmission packet scheduled by the channel-condition-based scheduling unit to have a predetermined relationship.

9. The base station as claimed in claim 1, further comprising:

a frequency allocation position control unit configured to control a frequency allocation position for the transmission packet or the retransmission packet scheduled by the persistent scheduling unit and a frequency allocation position for the transmission packet or the retransmission packet scheduled by the channel-condition-based scheduling unit to have a predetermined relationship.

10. The base station as claimed in claim 1, wherein:

the channel-condition-based scheduling unit schedules the retransmission packet according to Asynchronous ARQ; and the control unit gives a higher priority to the transmission packet or the retransmission packet scheduled by the persistent scheduling unit upon allocating a radio resource, and allocates a radio resource to the retransmission packet scheduled by the channel-condition-based scheduling unit based on a result of allocation of the transmission packet or the retransmission packet scheduled by the persistent scheduling unit.

11. A base station having a retransmission function for transmitting a retransmission packet when an error is detected in a transmission packet which is transmitted to a mobile station, comprising:

a channel-condition-based scheduling unit configured to schedule a transmission packet or a retransmission packet by allocating a radio resource to the transmission packet or the retransmission packet based on a channel condition for the mobile station;

a broadcast/multicast data scheduling unit configured to schedule broadcast/multicast data on a broadcast/multicast channel by allocating a radio resource to the broadcast/multicast data to transmit the same transmission packet to multiple users within a cell; and a control unit configured to avoid contention between the radio resource allocated to the transmission packet or the retransmission packet by the channel-condition-based scheduling unit and the radio resource allocated to the broadcast/multicast data by the broadcast/multicast data scheduling unit, and a non-transitory transmitting unit configured to transmit the transmission packet or the retransmission packet to the mobile station as a result of control by the control unit.

12. The base station as claimed in claim 11, wherein:

the channel-condition-based scheduling unit schedules the retransmission packet according to Asynchronous ARQ; and the control unit gives a higher priority to the broadcast/multicast data scheduled by the broadcast/multicast data scheduling unit upon allocating a radio resource, and allocates a radio resource to the retransmission packet scheduled by the channel-condition-based scheduling unit based on a result of allocation of the broadcast/multicast data scheduled by the broadcast/multicast data scheduling unit.

13. A base station having a retransmission function for transmitting a retransmission packet when an error is detected in a transmission packet which is transmitted to a mobile station, comprising:

a channel-condition-based scheduling unit configured to schedule a transmission packet or a retransmission packet with a variable transmission time interval by allocating a radio resource to the transmission packet or the retransmission packet based on a channel condition for the mobile station;

a control unit configured to avoid contention among radio resources allocated to multiple retransmission packets with variable transmission time intervals by the channel-condition-based scheduling unit, and a non-transitory transmitting unit configured to transmit the transmission packet or the retransmission packet to the mobile station as a result of control by the control unit.

14. The base station as claimed in claim 13, wherein:
the channel-condition-based scheduling unit schedules the retransmission packet according to Asynchronous ARQ; and
the control unit gives a higher priority to a first retransmission packet among the multiple retransmission packets with variable transmission time intervals, and allocates a radio resource to a second retransmission packet among the multiple retransmission packets based on a result of allocation of the first retransmission packet.

* * * * *